US006558857B2

(12) United States Patent
Van Doorn et al.

(10) Patent No.: US 6,558,857 B2
(45) Date of Patent: May 6, 2003

(54) METHOD OF MANUFACTURING A COLOR DISPLAY DEVICE AND A COLOR DISPLAY DEVICE

(75) Inventors: Arie R. Van Doorn, Eindhoven (NL); Godefridus P. Van Melis, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 121 days.

(21) Appl. No.: 09/793,684

(22) Filed: Feb. 26, 2001

(65) Prior Publication Data

US 2002/0014828 A1 Feb. 7, 2002

Related U.S. Application Data

(62) Division of application No. 09/217,411, filed on Dec. 21, 1998.

(30) Foreign Application Priority Data

Dec. 29, 1997 (EP) .......................................... 97204129

(51) Int. Cl.[7] .............................. G02B 5/20; H01J 9/20

(52) U.S. Cl. .............................. 430/7; 430/27; 430/28; 430/321

(58) Field of Search .............................. 430/7, 27, 28, 430/321

(56) References Cited

U.S. PATENT DOCUMENTS

| | | | | |
|---|---|---|---|---|
| 3,917,794 A | * 11/1975 | Akagi et al. | .................. | 427/68 |
| 4,707,426 A | * 11/1987 | Dodds et al. | .................. | 430/25 |
| 5,476,737 A | * 12/1995 | Kusunoki et al. | ............. | 430/23 |

* cited by examiner

*Primary Examiner*—John A. Mcpherson
(74) *Attorney, Agent, or Firm*—Ernestine C. Bartlett

(57) ABSTRACT

A display device comprises a color filter pattern between a phosphor pattern and a display window. For blue, the thickness ($t_2$) of this color filter pattern is more than 2.5 micrometer, preferably 5–7 micrometer, and/or for red said thickness is 0.25–1.5 micrometer. The red and/or blue color filter patterns are provided by means of a non-linear photoresist. This enables an improved contrast (LCP) to be achieved.

5 Claims, 5 Drawing Sheets

METHOD OF MANUFACTURING A COLOR DISPLAY DEVICE AND A COLOR DISPLAY DEVICE

CROSS REFERENCE TO RELATED APPLICATIONS

This is a divisional of application Ser. No. 09/217,411 filed Dec. 21, 1998.

BACKGROUND OF THE INVENTION

The invention relates to a method of manufacturing a display device comprising a display window, a phosphor pattern and a color filter pattern between said display window and said phosphor pattern, the color filter pattern being provided by means of an illumination process.

The invention also relates to a display device comprising a display window, a phosphor pattern and a color filter pattern between the display window and the phosphor pattern.

Color display devices are employed, inter alia, in television receivers and computer monitors.

A color display device of the type mentioned above is known. Said known color display device comprises a phosphor pattern including sub-patterns of phosphor regions luminescing in red, green and blue (hereinafter also referred to as "red", "green" and "blue" phosphors), and it further comprises a black matrix. A black matrix layer is a black layer provided with apertures or a system of black stripes on the substrate and (partly) between the phosphor regions of which the phosphor pattern is built up, said black matrix layer improving the contrast of the image displayed. The black matrix is provided with apertures, which accommodate colored layers (also referred to as color filter layers) on which a phosphor region of a corresponding color is deposited. The color filter layer absorbs incident light of wavelengths other than the wavelength of the light emitted by the relevant phosphor. This results in a reduction of the diffuse reflection of incident light and improves the contrast of the image displayed. In addition, the color filter layer (for example a "red" layer) may absorb a part of the radiation emitted by the "red" phosphor, i.e. the part having wavelengths outside the red portion of the visible spectrum. This results in an improvement of the color point of the red phosphor. The known color display device has a color filter layer for each of the phosphors (red, green and blue). For clarity, it is noted that "red", "blue" and "green" color filter regions have a relatively high transmission for, respectively, red, blue and green light. The color indication of the color filter layers relates to the transmission properties of the filters, not to their color. The color filter layers are customarily provided by means of an illumination process. For this purpose, a photoresist is provided and exposed to (UV) light.

The color filter patterns increase the contrast. It has been found, however, that in known methods and known display devices, the gain in contrast is insufficient.

It is an object of the invention to provide a method by means of which the contrast can be improved, and to provide a display device having an improved contrast.

To achieve this, the method in accordance with the invention is characterized in that a color filter pattern is provided by means of a negative lithography process in which a non-linear photoresist is used.

SUMMARY OF THE INVENTION

The color filter layers contain absorbing substances (pigments). Due to the relatively low extinction coefficients of the absorbing substances in the blue color filter pattern, the thickness of this pattern is relatively large. When use is made of a linear negative lithographic photoresist (for example PVA/ADC or PVA/SBQ resists) there is a risk that, for example, blue color filter materials will deposit at positions of green and/or red phosphor elements. Since the blue color filter material absorbs green and red light, this causes the contrast to be reduced. In the known method, the maximum, usable thickness of the blue color filter pattern is approximately 2.0–2.5 micrometer. At a larger thickness, the above problem is aggravated such that the contrast is reduced substantially. The above-mentioned positive effect of the invention also occurs with other color filter patterns.

In the method in accordance with the invention, use is made of a non-linear resist. By virtue thereof, the adhesion of color filter material at positions of phosphor elements of a different color can be precluded more effectively. A further advantage resides in that the thickness of the color filter pattern (no matter which color) exhibits less variation. This has a positive effect on the contrast.

The blue color filter pattern is preferably thicker than 4 micrometer, preferably approximately 6 micrometer (for example in the range between 5 and 7 micrometer).

The invention is also based on the realization that, as a function of the thickness of a color filter pattern, the gain in contrast varies and exhibits an optimum. In the case of a blue color filter pattern, this optimum occurs at a value above 4 micrometer. The display device in accordance with the invention has a blue color filter pattern with a thickness above 4 micrometer, preferably in the range between 5 and 7 micrometer.

In the case of display devices having a red color filter pattern, the thickness of the red color filter pattern preferably ranges between 0.25 and 1.5 micrometer. In this range, a gain in contrast is achieved. Preferably, the thickness of the red color filter pattern ranges between approximately 0.25 and approximately 0.37 micrometer, or between approximately 0.45 and approximately 0.60 micrometer. The gain in contrast exhibits optima at these thicknesses.

The term "thickness" is to be taken to mean within the scope of the invention, the average thickness of the color filter below phosphor elements.

These and other aspects of the invention will be apparent from and elucidated with reference to the embodiments described hereinafter.

In the drawings.

The Figures are not drawn to scale. In the Figures, like reference numerals generally refer to like parts.

DETAILED DESCRIPTION OF THE PREFERRED EMBODIMENTS

Figure 1:
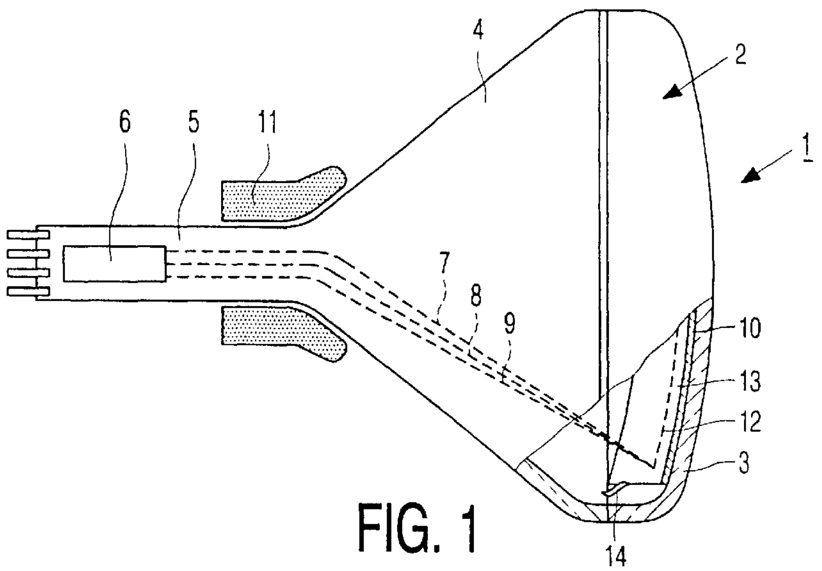
FIG. 1 is a sectional view of a display tube.

A color display tube 1 (FIG. 1) comprises an evacuated envelope 2 which includes a display window 3, a cone portion 4 and a neck 5. Said neck 5 accommodates an electron gun 6 for generating three electron beams 7, 8 and 9. A display screen 10 is situated on the inner surface of the display window. Said display screen 10 comprises a phosphor pattern of phosphor elements luminescing in red, green and blue. On their way to the display screen 10, the electron beams 7, 8 and 9 are deflected across the display screen 10 by means of a deflection unit 11 and pass through a show mask 12 arranged in front of the display window 3, which shadow mask 12 comprises a thin plate with apertures. The shadow mask is suspended in the display window by means of suspension means 14. The three electron beams 7, 8 and 9 pass through the apertures 13 in the shadow mask at a small angle relative to each other and hence each electron beam impinges only on phosphor elements of one color.

Figure 2A:
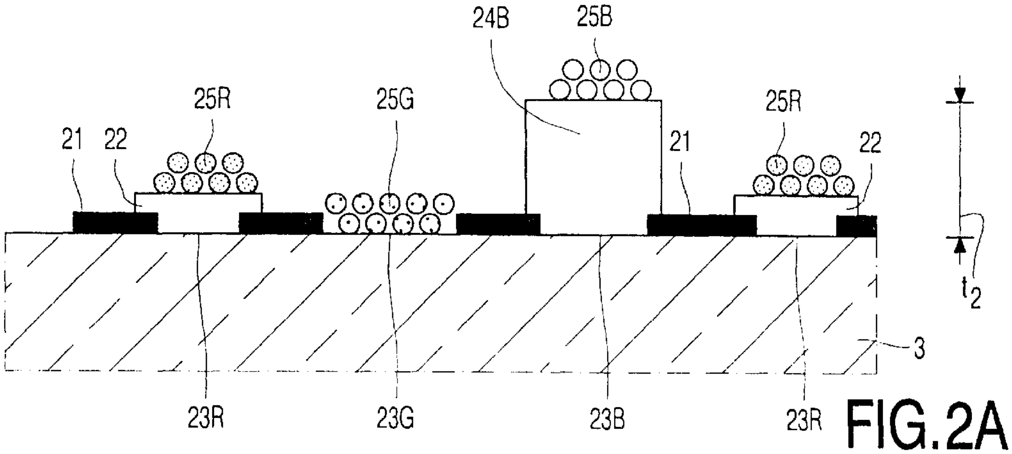
FIG. 2A is a sectional view of a display window of a display tube in accordance with the invention provided with color filter layers.
Figure 2B:
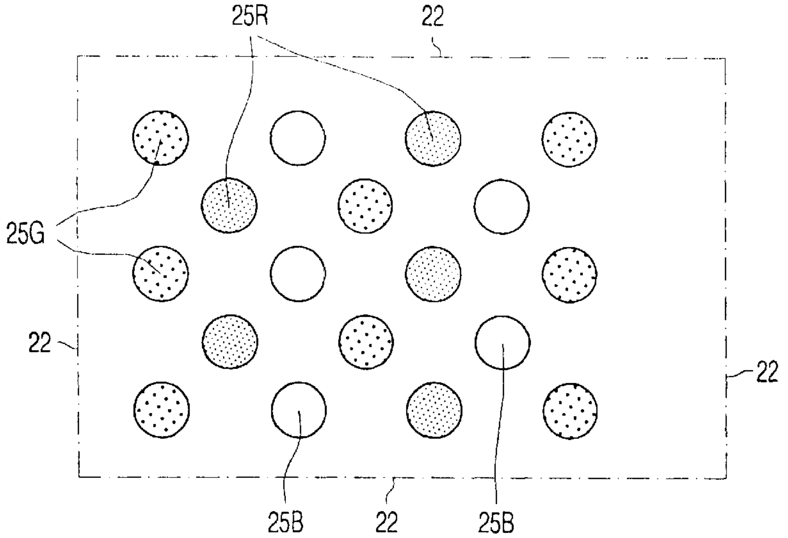
FIG. 2B is a view of a display window for a display tube in accordance with the invention.

FIGS. 2A and 2B schematically show the positions and relative thicknesses of the various layers.

FIG. 2A is a sectional view of a display window of a color cathode ray tube in accordance with the invention. FIG. 2B is a view (onto the phosphor elements) of the display window shown in FIG. 2A. The inner surface of the display window is provided with a black matrix 21. A color filter layer 22 extends over apertures 23R for phosphor elements R (red) and over the black matrix 21 with the exception of the apertures 23B, 23G for the phosphor elements B (blue) and G (green). In the apertures 23B, color filter layer regions 24B are provided. The color filter layer regions 24B project above the black matrix. In this example, the thickness $t_2$ of the color filter layer 24B is above 4 micrometer, preferably approximately 6 micrometer. Above the apertures 23R, 23G and 23B, there are provided phosphors 25R, 25G and 25B, respectively, the color filter layers extending between the phosphors and the substrate.

Figure 3A:
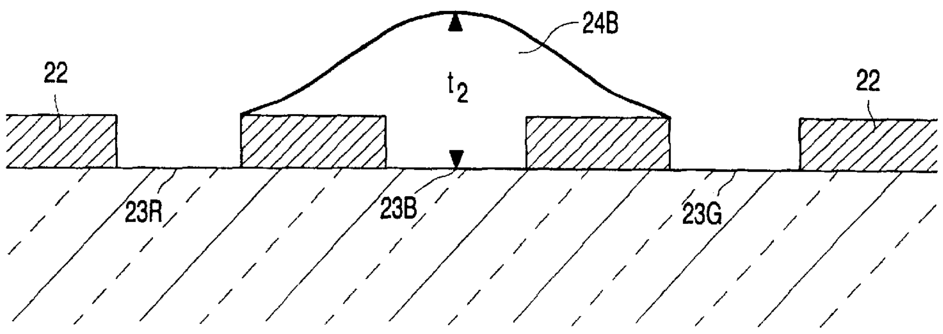
FIGS. 3A and 3B are, respectively, a sectional view and a plan view in which the thickness and thickness variation of a blue color filter layer manufactured in accordance with the known method is shown in greater detail and more realistically.
Figure 3B:
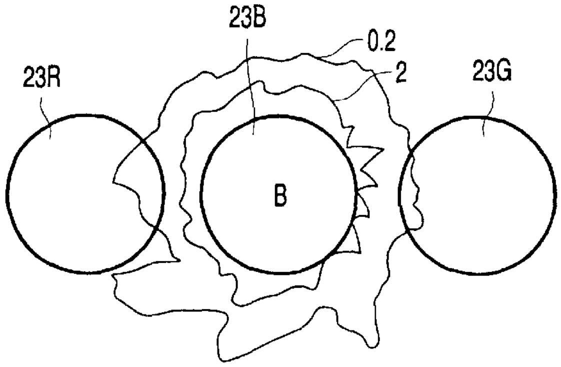

FIGS. 3A and 3B show, respectively, a sectional view and a plan view of the thickness and thickness variation of a blue color filter layer in greater detail and more realistically. The blue color filter layers shown in this Figure are provided by means of a linear resist. Examples of linear resists include PVA/ADC (PolyVinyl Alcohol/Ammonium DiChromate) and PVA/SBQ (PolyVinyl Alcohol/StilBazole Quartinized) systems. The thickness $t_2$ is approximately 2.5 micrometer. In FIG. 3B, a few thickness lines are schematically shown. Apertures 23R and 23G partly contain a thin layer of blue color filter material. However, the blue color filter material absorbs green and red light. This is undesirable because it reduces the light intensity, the contrast and causes color differences. The risk that blue color filter material is situated under parts of phosphor elements of a different color increases as the thickness of the color filter layer increases. Within the scope of the invention it has been recognized that, for known methods, this also means that, in practice, the thickness $t_2$ is limited to approximately 2.5 micrometer.

FIGS. 3A and 3B also show that the thickness $t_2$ of the blue color filter exhibits a variation above the aperture 23B. This reduces the gain in contrast.

Figure 4A:
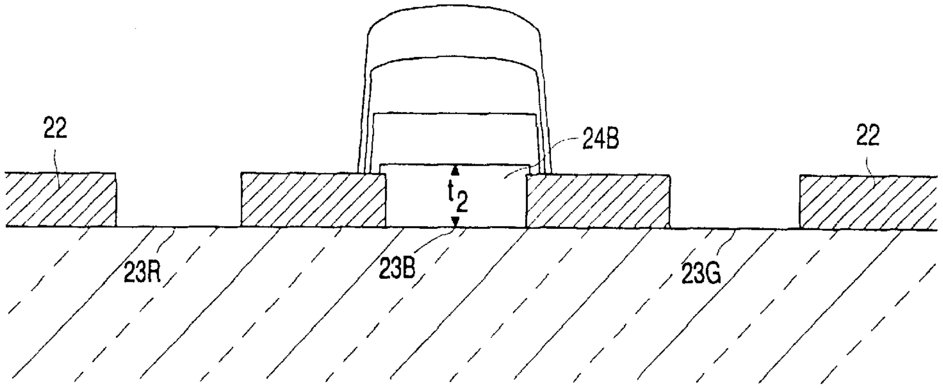
FIGS. 4A and 4B are, respectively, a sectional view and a plan view in which the thickness and the thickness variation of a blue color filter layer manufactured in accordance with the inventive method is shown in greater detail and more realistically.
Figure 4B:
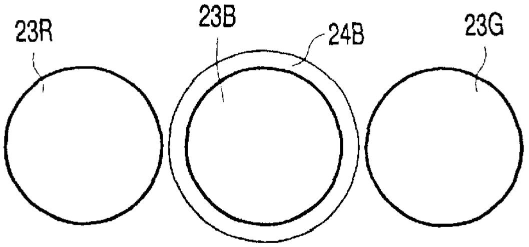

FIGS. 4A and 4B show, respectively, a sectional view and a plan view of the thickness and the thickness variation of a blue color filter layer in greater detail and more realistically, the blue color filter layers shown in this Figure being provided by means of a non-linear resist. Examples of non-linear resists include PAD/DAB (Poly (AcrylamideDiacetoneacrylamide))/DiAzidostilbenzene diBenzalacetone), PVP (PolyVinyl Pyrrrolidone)/Oligoazide (for example AS-98 by Toyo Gosie Kogyo Co, Japan), PVP/DAB, PVP/PVA/DAB, PVP/DAS and PVP/PVA/DAS systems. For the blue pigment in the color filter layer use can be made of cobalt aluminate. As a result of the non-linear character of the resist, the color filter pattern has a more rectangular shape, when viewed in cross-section, and the thickness across the aperture 23B is less subject to variation. The risk of blue color filter material adhering in apertures 23R and/or 23G is substantially reduced. As a result, the contrast is improved and thicker (i.e. thicker than 4 micrometer) blue color filter layers can be used, preferably with a thickness of approximately 6 micrometer.

Figure 5A:
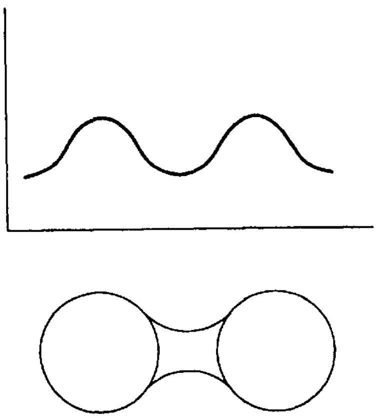
FIGS. 5A and 5B illustrate the operation of linear and non-linear resists.
Figure 5B:
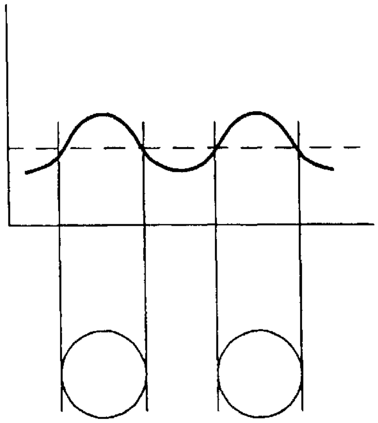

FIGS. 5A and 5B illustrate the action of linear resists (FIG. 5A) and non-linear resists (FIG. 5B). In the case of linear photoresists, crosslinking occurs at each intensity. The upper part of the FIGS. 5A and 5B schematically shows the intensity of the light incident on a photoresist, the lower part shows the parts of the photoresist which are being developed. The photoresist is developed by means of so-called crosslinking. The degree of crosslinking in FIG. 5A is approximately linearly dependent upon the intensity I of the (UV) light incident on the photoresist. As a result, also in places with a relatively low intensity, a certain degree of crosslinking occurs between the intensity peaks. Due to this, the thickness of the color filter layer varies. When use is made of non-linear resists (FIG. 5B), crosslinking depends much more on the intensity, namely to such a degree that below a certain intensity $I_t$ crosslinking hardly occurs while above said intensity substantially complete crosslinking occurs. In the case of non-linear resists, two reactions occur, i.e. a first reaction in which, as a result of incident light, components capable of crosslinking are formed, and a second reaction which can preclude crosslinking of said components, generally as a result of a reaction with oxygen. At low intensities, there is effectively no crosslinking. At light intensities above a threshold value, said components are formed in such large numbers that the oxygen present cannot preclude crosslinking. The transition between effective crosslinking or not is quite well defined. As a result, the edges of the developed portion of the photoresist are more accurately defined and there is less variation in thickness.

Figure 6:
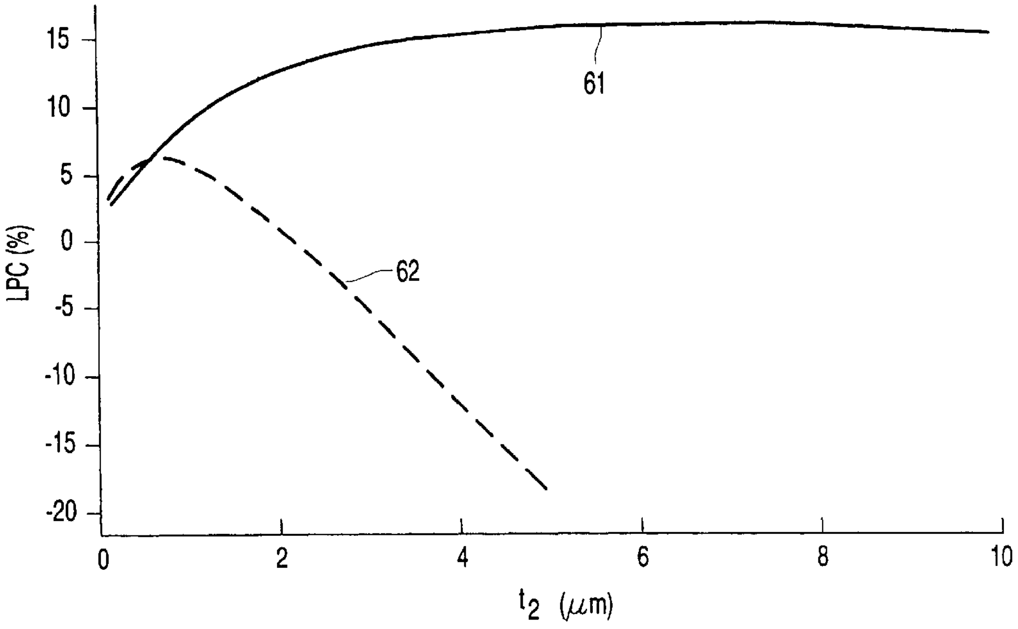
FIG. 6 illustrates the gain in contrast as a function of the thickness of color filter patterns.

FIG. 6 shows the gain in contrast as a function of the thickness of color filter patterns.

FIG. 6 shows, as a function of the thickness $t_2$ of a blue color filter pattern (line 61) and the thickness of a red color filter pattern (line 62), the gain in contrast (in %) (LCP). In this example, the blue color filter pattern comprises cobalt blue and the red color filter pattern comprises hematite. Both lines exhibit a maximum, i.e. for line 61 at approximately 6 micrometer, and for line 62 at approximately 0.6 micrometer. In order to maximally exploit the advantages offered by the filter layers, the thickness of a blue color filter pattern preferably exceeds 4 micrometer (for example between 5 and 7 micrometer). Preferably, the thickness of a red color filter pattern ranges between 0.25 and 1.5 micrometer.

Figure 7:
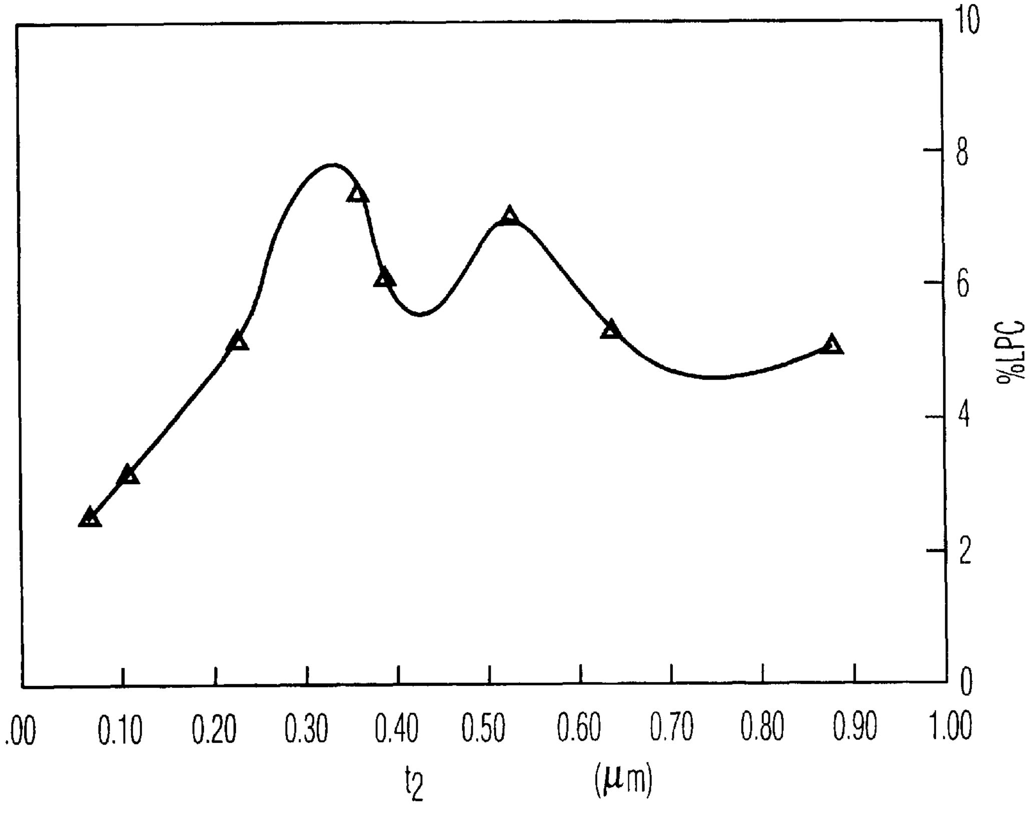
FIG. 7 shows a detail of FIG. 6.

FIG. 7 shows a detail of FIG. 6, in which the gain in contrast (LCP) is shown as a function of the layer thickness ($t_2$) for layer thicknesses below 1 micrometer. Preferably, the thickness of the red color filter pattern ranges between approximately 0.25 and approximately 0.37 micrometer or between approximately 0.47 and approximately 0.60 micrometer. At these thicknesses, the gain in contrast exhibits optima, probably as a result of interference phenomena.

Apart from maxima, the graphs also show that differences in thickness of color filter layers cause differences in gain in contrast. Such differences are generally undesirable because they may lead to color differences and color point shifts. Consequently, the use of non-linear photoresists offers advantages for each thickness and color of a color filter pattern and for both a red and a blue color filter pattern. Apart from the above-mentioned advantages, the use of a non-linear resist for a red color filter pattern has the advantage that, owing to the generally very high absorption of UV light by the red pigment in the color filter layer, the known linear resists can only be used to manufacture layers having a thickness of the order of 0.10 to 0.15 micrometer. As a result of said very high absorption, the intensity decreases very rapidly across the thickness of the photoresist. Consequently, if the layer thickness is too large, the degree of crosslinking which occurs in the lower portion of the photoresist layer is so small that this lower portion is in fact not illuminated. Besides, in the case of display devices with a black matrix, the light intensity at the edges of the holes in the black matrix is so small that insufficient crosslinking occurs, so that the edges of the color filter stripes or islands become disconnected. Such "disconnected edges" may become detached and detached parts may cause failure in a cathode ray tube. By making use of a non-linear resist, these problems are solved partly or completely. Preferably, for the red color filters use is made of a non-linear resist comprising PAD (PolyAcryl Diacetonamide) having a high molecular weight (above $10^6$ g/mol), the ratio acrylamide/diacetonamide preferably being above 1.5.

Figure 8A:
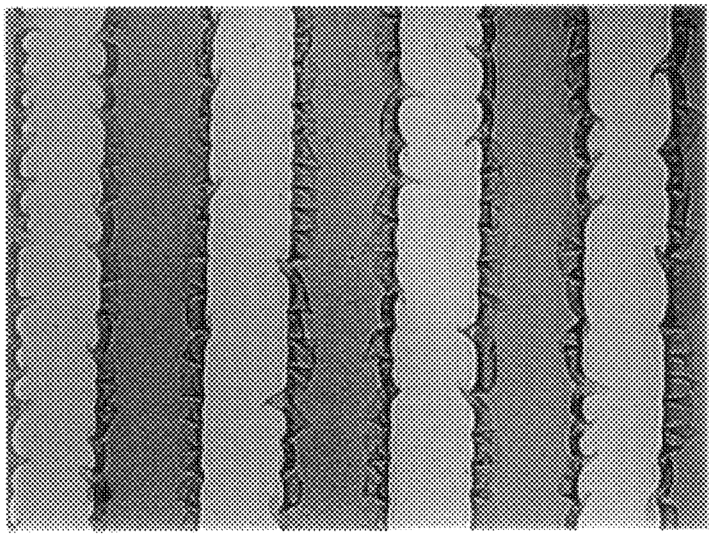
FIGS. 8A through 8C illustrate a difference between the use of linear and non-linear resists for a red color filter pattern.
Figure 8B:
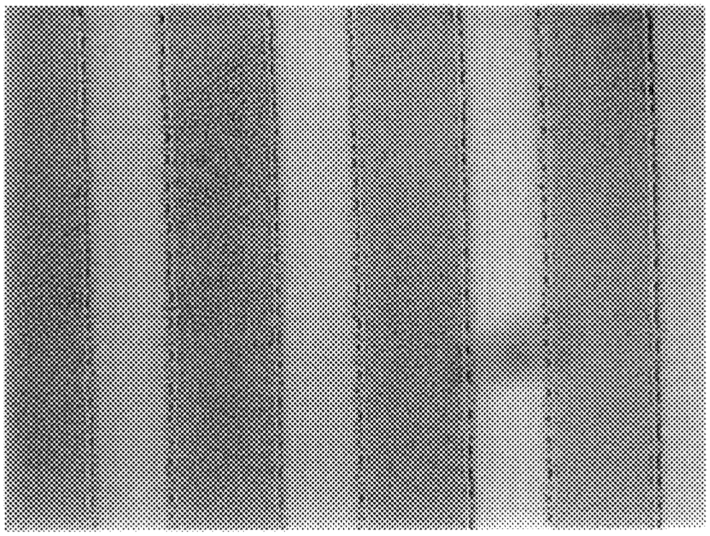
Figure 8C:
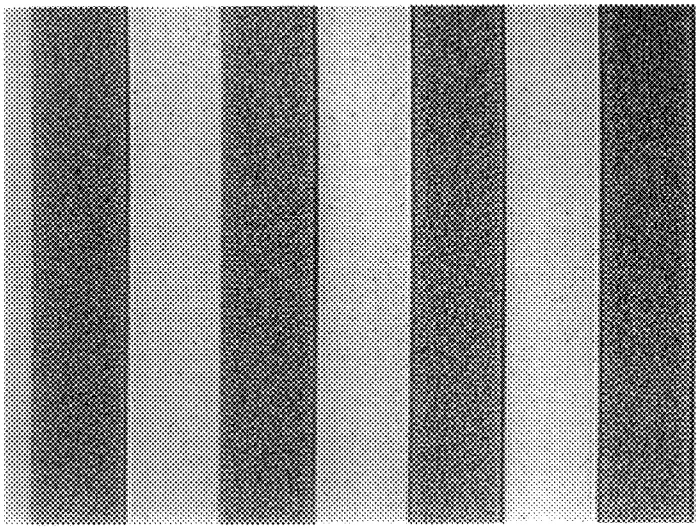

FIGS. 8A through 8C show a red filter pattern (in this example in the form of a stripe pattern) for a PVA/SBQ linear resist (FIG. 8A), for a PVA/ADC linear resist (FIG. 8B), and for a PAD/DAB non-linear resist. FIGS. 8A and 8B clearly show that in the case of linear resists, the edges of the color filter stripes are ragged, while the edges shown in FIG. 8C are accurately defined. For a blue color filter pattern, very good patterns are obtained by using a PVP/PVA/DAB composition in which the weight ratios (in solid substance) are approximately as follows:

PVP/PVA=5–8

PVP/DAB=6–12 blue pigment (for example, cobalt aluminate)/PVB=4–9.

The invention can be summarized as follows: a display device comprises a color filter pattern between a phosphor pattern and a display window. For blue, the thickness ($t_2$) of this color filter pattern is more than 2.5 micrometer, preferably 5–7 micrometer, and/or for red said thickness is 0.25–1.5 micrometer. The red and/or blue color filter patterns are provided by means of a non-linear photoresist. This enables an improved contrast (LCP) to be achieved.

It will be obvious that the invention is not limited to the above examples. For example, in FIG. 1 a classic-type color cathode ray tube is shown. Within the scope of the invention, the term "color display device" is to be interpreted in a broad sense as any display device comprising a pattern of phosphors luminescing in three colors on a substrate. Flat display devices of various types, such as plasma displays, are color display devices.

What is claimed is:

1. A method of manufacturing a display device comprising a display window, a phosphor pattern and a color filter pattern between said display window and said phosphor pattern, the color filter pattern being provided by means of an illumination process, characterized in that a color filter pattern is provided by means of a negative lithography process in which a non-linear photoresist is used.

2. A method as claimed in claim 1, characterized in that a blue color filter pattern is provided.

3. A method as claimed in claim 2, characterized in that the thickness of the blue color filter pattern is above 2.5 micrometer.

4. A method as claimed in claim 1, characterized in that a red color filter pattern is provided.

5. A method as claimed in claim 4, characterized in that the thickness of the red color filter pattern is above 0.25 micrometer.

* * * * *